United States Patent [19]
Geiter

[11] Patent Number: 4,896,652
[45] Date of Patent: Jan. 30, 1990

[54] CELLULAR BASE FOR A GRILL

[75] Inventor: Robert A. Geiter, Lawrenceville, Ga.

[73] Assignee: Applied Ceramics, Inc., Doraville, Ga.

[21] Appl. No.: 271,417

[22] Filed: Nov. 10, 1988

Related U.S. Application Data

[63] Continuation of Ser. No. 886,302, Jul. 16, 1986, abandoned.

[51] Int. Cl.$^4$ .......................... A47J 37/00; F24C 3/00
[52] U.S. Cl. ................................ 126/41 R; 126/39 R; 126/39 J
[58] Field of Search .................. 126/25 R, 40 R, 41 R, 126/39 J, 39 K, 39 R, 38, 92; 431/326, 328

[56] References Cited

U.S. PATENT DOCUMENTS

| | | | |
|---|---|---|---|
| 1,420,688 | 6/1922 | DeLaitte | 126/39 J |
| 2,180,868 | 11/1939 | Dunning et al. | 126/41 R |
| 3,067,811 | 12/1962 | Webster | 126/41 R |
| 4,043,312 | 8/1977 | Kern | 126/41 R |
| 4,290,408 | 9/1981 | Juett | 126/25 R |
| 4,321,857 | 3/1982 | Best | 126/41 R |
| 4,351,313 | 9/1982 | Kern | 126/39 J |
| 4,593,676 | 6/1986 | Wackerman | 126/39 R |
| 4,662,349 | 5/1987 | McKenzie et al. | 126/41 R |

*Primary Examiner*—James C. Yeung
*Attorney, Agent, or Firm*—Jones, Askew & Lunsford

[57] ABSTRACT

A cellular base member is disclosed for use, in particular, with a barbeque grill. The preferred base member is made of ceramic and provided in a honeycomb shape. When fixedly disposed between the heat source and the cooking surface of a barbeque grill, the disclosed cellular base member retains and evenly radiates heat to the cooking surface. Furthermore, should any fatty food substance or the like fall from the cooking surface, the cellular base member vaporizes such food substance before it reaches the heat source, thereby eliminating the problem of flame flare-up.

14 Claims, 4 Drawing Sheets

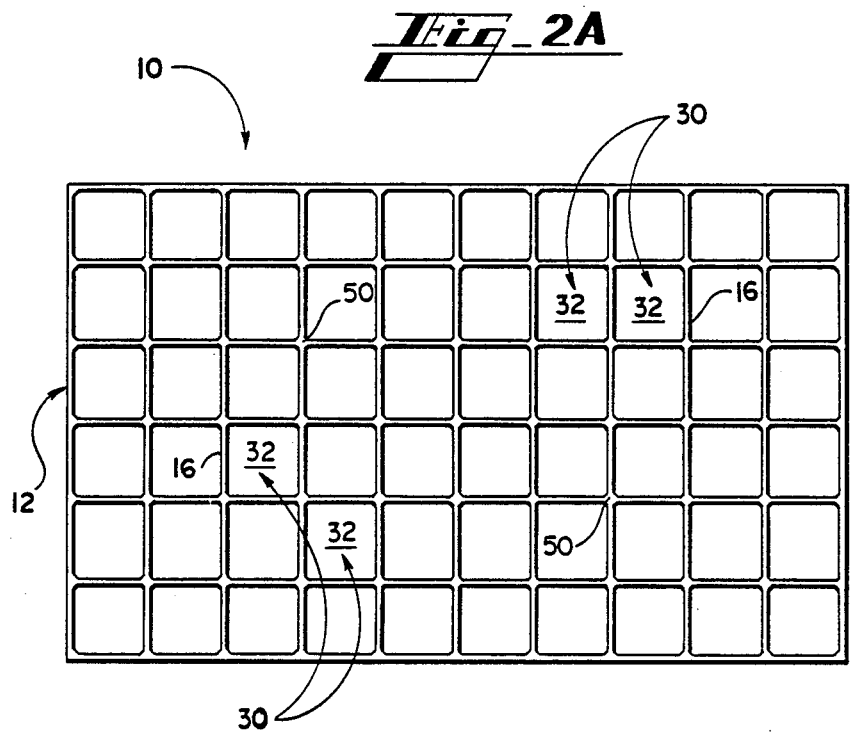

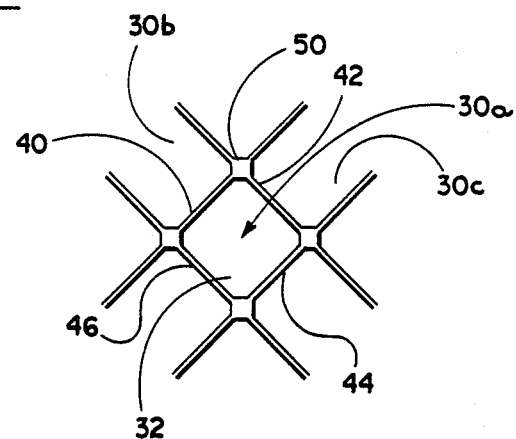
Fig_3
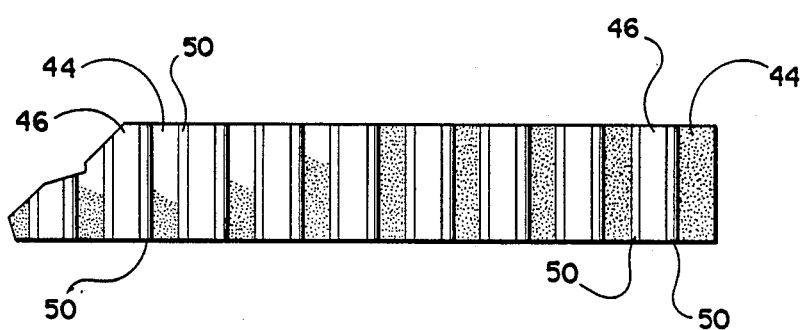
Fig_4

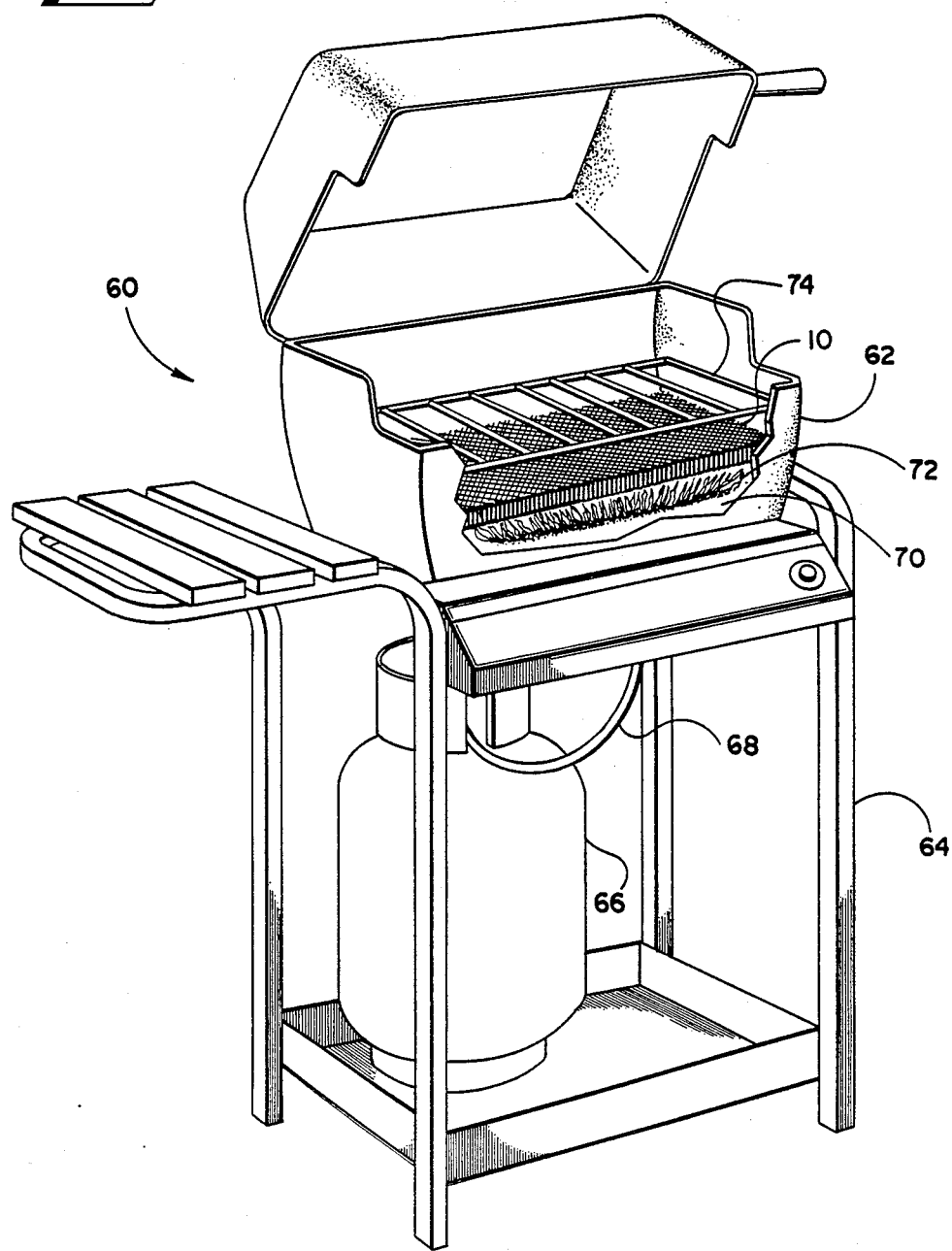

CELLULAR BASE FOR A GRILL

This is a continuation of application Ser. No. 886,302, filed July 16, 1986, abandoned.

TECHNICAL FIELD

The present invention relates to a cellular base for use with a barbeque grill or the like, and more particularly discloses a ceramic honeycombed base suspended between the flame and the cooking surface of a barbecue grill to provide an even source of heat and to prevent flame flare-up during the cooking process.

BACKGROUND OF THE INVENTION

Barbeque grills, whether fueled by gas, propane or charcoal, all contain the same basic elements: a flame, a heat retaining/radiating substance and a cooking surface or rack. Barbeque grills fueled by charcoal conventionally utilize a lighter fluid or the like to provide an initial flame. Once ignited, the heat retaining/radiating substance is the glowing charcoal which slowly burns, dissipating heat to the food suspended over the coals on the cooking rack. The disadvantage of the charcoal grill is that burning charcoal, by nature, generates combustion by-products in the form of unoxidized carbon particulate. Of course, charcoal brickettes are recognized as messy even before burning due to the charcoal dust. Yet another disadvantage of using a conventional charcoal fueled grill is that charcoal requires prolonged exposure to the flame before the coals become hot enough to burn independently of the flame and are able to sustain sufficient heat to cook the food. Yet another problem with charcoal fueled grills is flame flare-up where fatty substances and the like fall from the cooking food onto the hot charcoal brickettes, are ignited and scorch the food. These flare-ups are also hazardous to the safety of the cook.

Gas grills were devised to eliminate the disadvantages of the charcoal grill; namely—charcoal dust, the unoxidized particulate matter generated by burning charcoal and the time delay involved in heating the coals. In the conventional gas grill, a gas flame heats lava rocks suspended between the flame and the cooking rack. The lava rocks are made from a heat retaining material and provide a stable heat source for cooking food placed upon the rack. Of course, a gas grill provided with lava rocks suffered from flame flare-up when food particles or substances fell onto the rocks and ignited. In response to this problem, an intermediate rack made of a conventional masonry material was provided in place of the lava rocks. However, such gas grills failed to eliminate the problem of flame flare-up because fatty substances and the like continued to drip down from the food onto the rack (as opposed to the lava rocks) became heated, ignite, and cause a flare-up or burst of flame that scorched the food, making it undesirable for human consumption.

A further disadvantage of conventional gas grills (as well as charcoal fueled grills) is that the lava rocks (or the charcoal) gradually lose their ability to retain heat and must be replaced periodically.

Yet another disadvantage shared by both the charcoal fueled grill and the conventional gas grill is that certain areas of the cooking surface become "hotter" than other areas. This results in unevenly cooked food wherein certain portions of the food are undercooked while other portions are overcooked. Those skilled in the art will appreciate that this phenomenon is measured by the "toast test", whereby a piece of bread is set on the cooking surface and the distribution of heat is measured by a review of the toasted and non-toasted portions of the bread. Manufacturers of gas grills have long realized and wrestled with the problem of providing an evenly distributed heat transfer for the heat source to the cooking surface.

In short, there exists a need for a grill that eliminates flame flare-up and provides an even distribution of heat.

SUMMARY OF THE INVENTION

The present invention solves the above-described problems with prior art grills by providing a base for a gas grill that eliminates flare-ups and provides an evenly distributed source of heat for cooking food.

Generally described, the present invention comprises a cellular base member for use in a heating apparatus, wherein the base member is mounted intermediate a heat source and a heating surface to eliminate flame flare-up and provide an even distribution of heat from the heat source to the heating surface.

More particularly described, the preferred base member is formed in a honeycomb shape and made of a ceramic material. The ceramic material is capable of maintaining a very high temperature. The base member defines a plurality of adjacent, elongated cells. The density of the preferred cells may range from sixteen cells per square inch to 200 cells per square inch. The thickness of the preferred base member may range from one-fourth inch to one inch.

Accordingly, the preferred use of the present invention is as a base member for a gas grill in place of lava rocks, masonry rock or the like. Because the honeycomb-shaped, ceramic base member is capable of maintaining a very high temperature, any fatty substances or the like that fall or drop from the cooking food are vaporized upon contact with the cellular base, thereby preventing flame flare-up. It has been found that the shape of the individual cells may vary and that square, round, triangular, hexagonal and octagonal shaped cells are preferable. In addition, because the entire base member becomes heated upon operation of the grill, an even distribution of heat is achieved and imparted to the food being cooked.

Thus, it is an object of the present invention to provide a cellular base for a grill.

It is a further object of the present invention to provide an improved heat source base for a barbeque grill.

It is a further object of the present invention to provide a base which will eliminate flame flare-up in a barbeque grill.

It is a further object of the present invention to provide a base which evenly distributes heat to the cooking surface of a barbeque grill.

It is a further object of the present invention to provide a base for a barbecue grill that will not lose its ability to retain heat and thus will not require replacement.

Other objects, features and advantages of the present invention will become apparent from reading the following specification in conjunction with the accompanying drawings.

BRIEF DESCRIPTION OF THE DRAWING

FIG. 2A is a top plan view of a second embodiment of a cellular base for a grill according to the present invention.

FIG. 3 is a top plan view of the embodiment shown in FIG. 1, showing in particular a cell and its adjacent cells and enlarged to show detail.

FIG. 4 is a vertical cross section of the cellular base shown in FIG. 1 taken along line 3—3.

FIG. 5 is a pictorial view of a barbeque grill with portions cut away to show the preferred use of the cellular base.

DETAILED DESCRIPTION

Figure 1:
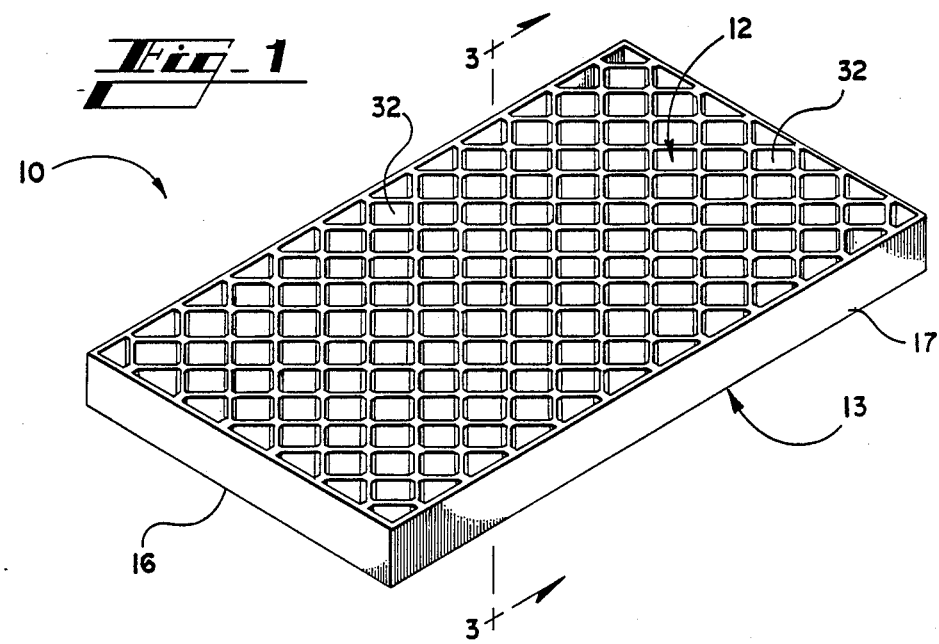
FIG. 1 is a pictorial view of a portion of a cellular base for a grill embodying the present invention.

Referring now in more detail to the drawing, in which like reference numerals represent like parts throughout the several views, FIG. 1 shows a cellular base member embodying the present invention. The cellular base 10 is generally a block, rectangular in shape, defined by a planar upper surface 12 and a planar lower surface 13 parallel to the top surface. The upper surface 12 and the lower surface 13 are held in a spaced apart relationship by a plurality of connected walls 16, lying perpendicular to the upper and lower surfaces. Preferably, the walls 16 of the cellular base 10 are made of a ceramic material capable of withstanding and retaining intense heat.

Figure 2:
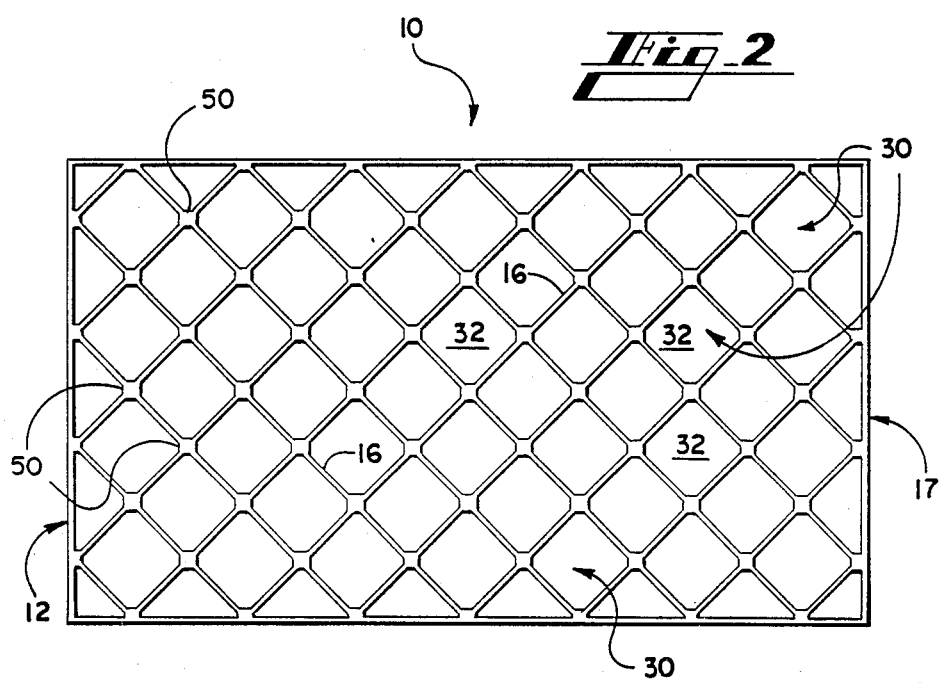
FIG. 2 is a top plan view of the embodiment of the cellular base of the present invention shown in FIG. 1.

As may be seen from FIGS. 1 and 2, the connected walls 16 of the cellular base 10 intersect at regular intervals, thereby defining a repeating array of cells 30. This repeating array of cells 30 creates a honeycomb appearance. Preferably, the thickness of the base 10, or the vertical distance between the upper surface 12 and the lower surface, ranges from approximately one-quarter inch to one inch. As such, the cellular base member 10 is readily formed as an extruded part provided with an outer skin 17.

FIG. 2A shows a second embodiment of the invention having wall portions 16 (described in detail below) of substantial horizontal and vertical orientation (as shown in drawing). It will be appreciated that the embodiments of FIG. 1 and FIG. 2 are substantially identical in that they retain and transfer heat in the same manner for the purposes described herein below.

It will be understood by those skilled in the art that the honeycombed base 10 interposes a thermal mass between the heat source and the cooking surface of a gas grill. The base member 10 absorbs heat from a heat source and then slowly and evenly dissipates that heat to the food substance being heated or cooked. Therefore, as the thickness of the honeycombed base is increased, the efficiency of the transfer of heat from the heat source to the substance being heated is increased. However, a maximum efficiency is reached wherein the efficiency begins to decrease. It has been found that such maximum thickness lies within the range of one-quarter inch to one inch of block thickness.

Each cell 30 has an upper opening 32 and a lower opening (not shown). The upper opening 32 lies within the plane of the upper surface 12 and the lower opening lies within the plane of the lower surface 13 of the cellular base 10. The shape of the openings of each cell 30, as defined by the connected walls 16, may vary. Through experimentation, it has been determined that suitable shapes for cells include square, round, triangular, hexagonal, and octagonal. One skilled in the art will appreciate that yet other shapes may be provided so long as the heat retention and heat transfer characteristics of the preferred embodiment are maintained.

Turning now to FIG. 3, representative cells 30a, 30b and 30c identical to each cell 30 located within the cellular base 10, are shown in greater detail. It is to be noted that cells 30b and 30c are provided adjacent to cell 30a. In the preferred embodiment of the present invention, the cell 30a is defined by the intersection of four walls 40, 42, 44 and 46 connected at right angles, or nearly at right angles, to each other. Each intersection of the walls 40, 42, 44 and 46 is reinforced by a bevelled section 50 which is a square block of ceramic material designed to give the cellular base 10 structural stability and heat retention capability. The first wall 40 of the central cell 30a is parallel to the third wall 44, and the second wall 42 of the central cell is parallel to the fourth wall 46, so that the intersection of all four walls defines the diamond-shaped or rhomboid opening 32 of each cell 30 described above.

The cells 30 are arranged in such a way that adjacent cells share the ceramic walls 16 that lie between them. For example, looking once again at FIG. 3, the first adjacent cell 30b shares the first wall 40 with the central cell 30a, and second adjacent cell 30b shares the second wall 42 with the central cell. (The relationship of the walls 16 to one another can also be seen in FIG. 4.)

In the preferred embodiment of the present invention, the density of cells per square inch ranges from approximately 16 cells per square inch to 200 cells per square inch. If the density of cells is in excess of 200 cells per square inch, the amount of heat passing through the cells will be greatly decreased. If the density of cells is less than 16 cells per square inch, there will be a greater tendency for flame flare-up to occur. It will be understood by those skilled in the art that the cellular base 10 can have various regions containing different densities of cells within the range described above so as to provide areas within the base 10 of differing heat intensities or to correct for any uneven heat distribution resulting from the heat source.

Turning now to FIG. 5, the cellular base 10 of the present invention can be seen within a barbeque grill 60 fueled by gas. The grill 60 includes a body 62 which is supported at some convenient height above the ground by two pair of legs 64. A gas tank 66 is suspended below the grill body 62, and in fluid connection therewith by a gas line 68. The gas contained in the gas tank 66 passes therefrom through the gas line 68 to a series of conventional jets (not shown) mounted upon and covering a floor 70 of the grill body 62. Each jet provides a controlled flame 72 which, when ignited, provides a heat source for the grill 60.

The cellular base 10 of the present invention is suspended at a predetermined height immediately above the flames 72. A preferred height has been determined to be in the range of from one-half inch to six inches above the flame. A cooking surface 74 or rack is suspended at some predetermined height above the cellular base 10. It will be readily appreciated by those skilled in the art that the height of the cellular base 10 and the rack 74 may be adjustable.

The food to be cooked is placed upon the rack 74 after the gas jets have been ignited and the cellular base 10 has been allowed to absorb a sufficient amount of heat from the flames 72.

The cellular base 10 evenly radiates heat from the flames 72 in an upward direction toward the rack 74 upon which the food is placed. Fatty substances, flammable liquids and the like that seep from the food and drip down onto the cellular base 10 do so without risk of flame flare up because such substance and liquid is instantly vaporized when it contacts the upper surface 12 of the base 10 or flows into the cells 30. The liquids are thus prevented from coming in contact with the flames 72, thereby eliminating flame flare-up.

While the preferred embodiment of the present invention has been disclosed in the form of a cellular base for a gas grill, it is to be understood that the present invention has further applications. For example, in any manufacturing process where flame flare-up is a problem, the provision of a honeycomb-shaped, ceramic member is appropriate circumstances will substantially reduce if not eliminate the problem. It should therefore be understood that the foregoing relates only to a preferred embodiment of the present invention and that numerous modifications or alterations may be made therein without departing from the spirit and scope of the invention as set forth in the appended claims.

What is claimed is:

1. A cellular base for use in a heating apparatus including a heat source and a surface to be heated, comprising:
  a base member formed of a ceramic material defining a plurality of adjacent openings in a honeycomb-like fashion to permit the passage of air through said base member, the density of said openings ranging from 16 openings per square inch to less than 100 openings per square inch; and
  means for mounting said base member intermediate of said heat source and said surface to be heated whereby heated air is drafted from said heat source across the surface of the base member to radiate an even distribution of heat to said surface to be heated.

2. The cellular base of claim 1, wherein said base member ranges in thickness from one-fourth inch to one inch.

3. The cellular base of claim 1, wherein said honeycomb-shaped base member defines a plurality of adjacent, elongated cells.

4. A barbeque grill, comprising:
  a combustion fuel source;
  a cooking flame in fluid connection with said combustion fuel source;
  a cooking surface positioned above said cooking flame; and
  a ceramic base member disposed intermediate of said cooking flame and said cooking surface, said base member including a plurality of intersecting walls to define a plurality of adjacent vertical openings, whereby heated air is drafted upwardly through said openings in said base member, which radiates an even distribution of heat to said cooking surface and vaporizes fats and grease that fall from a food item placed on said cooking surface.

5. The heating apparatus of claim 4, wherein said base member ranges in thickness from one-fourth inch to one inch.

6. The heating apparatus of claim 5, wherein said honeycomb-shaped base member defines a plurality of elongated cells, with a density ranging from 16 to less than 100 cells per square inch.

7. The barbeque grill as recited in claim 4, further comprising a bevelled block extending vertically along each intersection of walls, whereby the intersection is reinforced.

8. The barbeque grill as recited in claim 7, wherein each bevelled block intersection has a square shape in cross-section.

9. A barbeque grill, comprising:
  a grill body defining a floor;
  a heat source mounted upon and covering said floor of said grill body, said heat source comprising a fuel tank containing flammable fuel, and a plurality of jets mounted upon said floor and in fluid communication with said fuel tank whereby heat is generated upon ignition of said fuel at the location of said plurality of jets;
  a cooking surface located at a predetermined height above said heat source for suspending food to be cooked above said heat source; and
  a cellular base member suspended between said heat source and said cooking surface, said cellular base member comprising a ceramic block formed having a plurality of elongated cells varying in density from 16 cells per square inch to 200 cells per square inch;
  whereby said cellular base effects an even and consistent transfer of heat from said heat source to said heating surface and, when cooking food, vaporizes any fatty substances or the like that may fall from said cooking surface, thereby eliminating any flare-up of the flame from said heat source.

10. A barbeque grill, comprising:
  a grill housing defining a cooking chamber having a floor and at least one sidewall;
  a combustion fuel source mounted on the exterior of said grill housing;
  means disposed on said grill housing floor for producing a cooking flame, said cooking flame producing means being in fluid connection with said combustion fuel source;
  means positioned a distance above said cooking flame within said housing for suspending a food to be cooked, said food suspending means being dimensioned so as to extend substantially the width and length of said cooking chamber; and
  means disposed intermediate of said cooking flame producing means and said food suspending means for vaporizing fat and grease substances that fall from said food item, said vaporizing means comprising a ceramic member defining a plurality of adjacent openings in a honeycomb-like fashion, the density of said openings ranging from 16 to less than 100 openings per square inch,
  whereby said openings in said vaporizing means permit heated air to rise directly from cooking flame producing means to said food suspending means to provide an even distribution of heat across said food suspending means and said vaporizing means further providing a second level of combustion such that any fat and grease substance that may fall from a food item on said suspending means is vaporized and does not contact said flame producing means.

11. A cellular base for a barbeque grill, the grill having a flame source and a cooking surface, the invention comprising a ceramic base member having vertical open-ended cells defined by interconnected walls, each intersection reinforced by a bevelled block extending vertically along the intersection, whereby the cells direct superheated air from a flame source below to a cooking rack above and the greases and fats dripping from the cooking food into the cells vaporize without flare-up.

12. The cellular base as recited in claim 11, wherein each reinforced intersection has a square shape in cross-section.

13. The cellular base as recited in claim 11, wherein the base has between 16 and 200 cells per square inch.

14. The cellular base as recited in claim 11, wherein the base has at least two areas having differing densities of cells.

* * * * *